H. GROB.
APPARATUS FOR PRODUCING A CONSTANT VOLTAGE WITH VARIABLE SPEED.
APPLICATION FILED MAR. 17, 1908.

1,016,825.

Patented Feb. 6, 1912.

Inventor
Hugo Grob

UNITED STATES PATENT OFFICE.

HUGO GROB, OF ZURICH, SWITZERLAND.

APPARATUS FOR PRODUCING A CONSTANT VOLTAGE WITH VARIABLE SPEED.

1,016,825.  Specification of Letters Patent.  Patented Feb. 6, 1912.

Application filed March 17, 1908. Serial No. 421,741.

*To all whom it may concern:*

Be it known that I, HUGO GROB, a citizen of the Swiss Confederation, residing at Zurich, Switzerland, have invented a new and useful Apparatus for Producing a Constant Voltage with Variable Speed; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a method of and apparatus for producing constant voltages to consumers' circuits although the speed of the generator and the load may both vary, and it consists in the novel steps and combinations of parts more fully set forth below.

There exist train lighting systems in which the voltage is kept constant independently of the speed and load by opposing it to an external independent voltage derived from a storage battery and the equalizing current which then flows is then utilized for the excitation of the generator or of its exciter. The external independent voltage is furnished by one half of an accumulator battery, the other half of which is at the same time being recharged. Since the voltage generated by a dynamo regulated in this manner, however, cannot be higher than the external independent voltage, which in this case is that of one of the battery halves, such dynamo voltage is obviously insufficient for charging the other battery half. In order to be able to charge said other half battery it has been, therefore, heretofore necessary to generate independently, besides the voltage directly regulated, a higher voltage, which must be also independent of the speed.

My invention, more specifically stated, utilizes a principle which with the method of regulating the voltage already described, allows of the generation of an additional constant voltage which is also independent of the speed, and which is higher than the external independent voltage.

In order to explain clearly my method and apparatus, reference is had to the accompanying drawings in which:—

Figure 1:
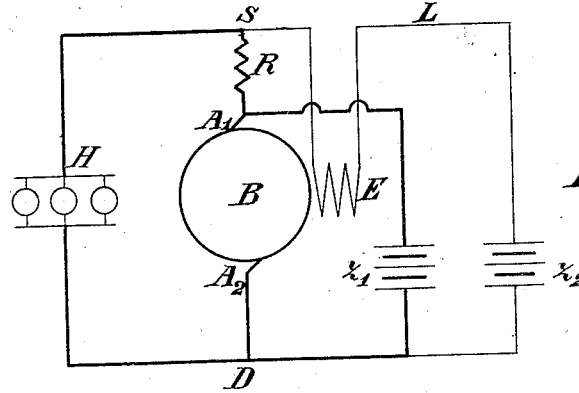
Figure 2:
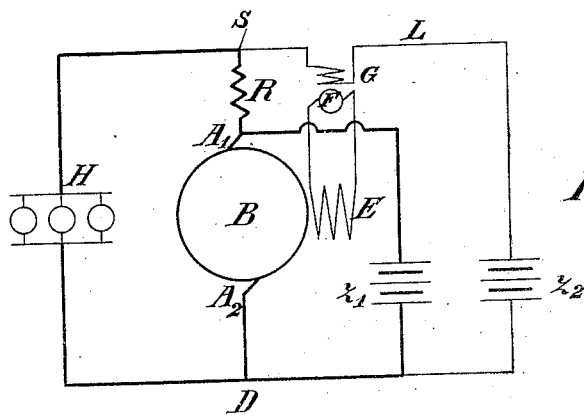
Figure 3:
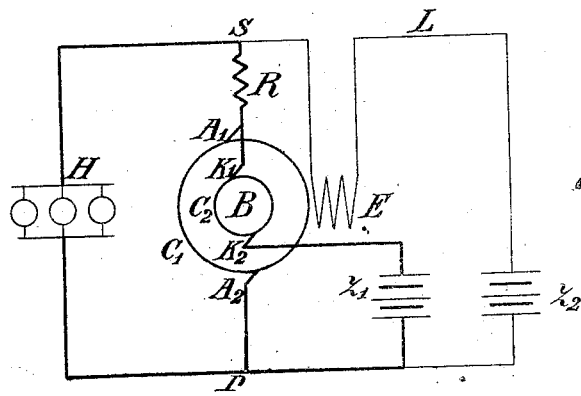

Figure 1, is a diagrammatic illustration of an apparatus embodying my invention; Fig. 2, is a like representation of a modified form; and, Fig. 3, is a diagrammatic illustration of a still further modified form of my invention.

Like letters refer to like parts in all the views.

B represents a generator of such a nature that it requires only a small exciting current, having the brushes $A_1$ and $A_2$; E represents an exciting coil for the generator B consisting of a few thick turns, and a small resistance; and R represents a resistance joining the brush $A_1$ to an end of the coil E as at S. The other end of the coil E is joined to one pole of a battery $Z_2$, through the conductor L. The other pole of said battery is joined to the brush $A_2$ as at D. The points D and S are also joined to the work circuit H, as shown, and the circuits are so connected that the poles of the dynamo are in opposition to the poles of the battery $Z_2$.

From what has been so far disclosed, it is evident, that as the dynamo speeds up its voltage will increase until at the point S it equalizes that of the opposing battery $Z_2$, and that when this occurs no current will pass through the exciting coil E. The dynamo voltage will, therefore, immediately fall, whereupon current from the battery $Z_2$ will again pass through the coil E and the dynamo voltage will immediately rise again. In other words, it is evident, that no matter how the speed or the load of the dynamo may change, its voltage at the point S will remain substantially constant, so long as it does not rise to a point materially higher than that of the battery $Z_2$ and the presence of the resistance R does not affect this result. In addition to said battery $Z_2$ in order to produce an independent constant voltage, I also connect one pole of the battery $Z_1$ to one pole of the battery $Z_2$ and to the brush $A_1$ and the other pole of said battery $Z_1$ I connect to the brush $A_2$ and to the other pole of the battery $Z_2$, as shown. The voltage of the battery $Z_1$ may be higher than the voltage of the battery $Z_2$, as will appear below.

Considering again the action of the battery $Z_2$ it is evident that the dynamo B must generate at its brushes a voltage higher than that of said battery before the current ceases in coil E, for the resistance R will diminish the voltage of the current passing through the points S, D, and the work circuit, although this loss is somewhat compensated by the current passing through said resistance from the said battery $Z_2$. It follows, therefore, that the voltage of the dynamo between its brushes $A_1$ $A_2$ is actually higher than that between the terminals of the work circuit, or between the poles of the battery $Z_2$; and further, this higher voltage is practically constant notwithstanding changes in the dynamo speed and in the load on the work circuit. It follows that by making the voltage between the poles of the second battery $Z_1$ higher than the voltage between the poles of the battery $Z_2$ and dependent upon the load current actually required at the terminals of the work circuit I am enabled to maintain the independent current between the poles of said battery $Z_1$ also substantially constant and at a higher voltage than the current from the battery $Z_2$.

In the accompanying drawing, Fig. 1 shows an apparatus having only one dynamo without an exciting dynamo. In the modified form shown in Fig. 2, however, is illustrated a similar view, showing an exciting dynamo F, G, but the latter could be combined with the main dynamo in one machine as is commonly done.

In order to diminish the influence of the size of the load current at the terminals of the work circuit on the voltage at the terminals of the battery $Z_1$, only a part of the increase in voltage may be produced in the resistance R, and the other part may be produced in a second winding $C_2$ on the armature of the generator B, as shown in Fig. 3. This winding being exposed to the same magnetic field as the main winding $C_1$, must, like the latter, generate also a constant voltage independent of the load current between the terminals of the work circuit.

An apparatus embodying my invention can be used in various places, for instance, on train lighting systems. The battery $Z_2$ may be a storage battery or a separate generator. The work circuit terminals, may supply current to lamps, and the higher voltage between the terminals of battery $Z_1$, may serve to charge other batteries or may be used for any other desired purpose.

It is evident that the arrangement of parts may be varied without departing from the spirit of my invention and, therefore, I do not wish to be limited to such an arrangement, except as may be required by the claims.

What I claim is:—

1. An apparatus for producing constant voltages on a pair of circuits while the speed of the generator varies comprising a generator; an exciting coil for the generator; a load circuit; an external independent source of voltage connected in parallel with the load circuit, the exciting coil being inserted into said connection; and a resistance inserted in the load circuit between the generator and a point where said external source connection reaches the load circuit, substantially as described.

2. An apparatus for producing constant voltages on a pair of circuits while the speed of the generator varies, comprising a generator; a load circuit; an external independent source of voltage; connections between the external independent source of voltage and two points of said load circuit; an exciting coil for the generator in one of said connections, and a resistance inserted in the load circuit between the generator and the point where the connection including the exciting coil reaches the load circuit, substantially as described.

3. An apparatus for producing constant voltages on a pair of circuits while the speed of the generator varies, comprising a generator; a load circuit; a storage battery furnishing an external and independent source of voltage; connections between said battery and two points on said load circuit; an exciting coil for the generator in one of said storage battery connections; and a resistance inserted in the load circuit between the generator and the point where said storage battery connects with the load circuit, substantially as described.

4. An apparatus for producing constant voltages on a pair of circuits while the speed of the generator varies, comprising a generator having brushes; a load circuit; a storage battery divided into halves and furnishing an external and independent source of voltage; means connecting both halves of the storage battery with the brushes of the generator; a resistance inserted in the load circuit; and a field coil in the connection between one of the half batteries and a brush of the generator, substantially as described.

In testimony whereof, I have signed my name to this specification in the presence of two subscribing witnesses.

HUGO GROB.

Witnesses:
 HERMANN HUBER,
 A. LEIBERKNECHT.